US006241428B1

(12) United States Patent
Stober

(10) Patent No.: US 6,241,428 B1
(45) Date of Patent: Jun. 5, 2001

(54) DEVICE FOR DUSTING MOVING PRINTED SHEETS

(75) Inventor: Thomas Stober, Urbach (DE)

(73) Assignee: Weitmann & Konrad GmbH & Co. KG, Leinfelden-Echterdingen (DE)

( * ) Notice: Subject to any disclaimer, the term of this patent is extended or adjusted under 35 U.S.C. 154(b) by 0 days.

(21) Appl. No.: 09/166,227

(22) Filed: Oct. 5, 1998

(30) Foreign Application Priority Data

Oct. 3, 1997 (DE) .......................................... 297 17 645 U

(51) Int. Cl.[7] ..................................................... B65G 53/12
(52) U.S. Cl. ............................................ 406/146; 406/198
(58) Field of Search .............................. 406/92, 122, 136, 406/144, 146, 198; 101/492; 346/150.01; 399/233

(56) References Cited

U.S. PATENT DOCUMENTS 3,093,420 * 6/1963 Levene et al. ....................... 406/166
3,854,634 * 12/1974 Hart ..................................... 406/136

FOREIGN PATENT DOCUMENTS 1 611 317 1/1971 (DE) .
29 49 060 7/1980 (DE) .
528 613 A2 2/1993 (EP) .
631410 * 11/1978 (RU) .................................... 406/136

* cited by examiner

*Primary Examiner*—Christopher P. Ellis
*Assistant Examiner*—Joe Dillon, Jr.
(74) *Attorney, Agent, or Firm*—Jones, Tullar & Cooper, P.C.

(57) ABSTRACT

The present invention relates to a device for dusting moving printed sheets, having a reservoir body for powder, an inlet for a carrier air flow terminating in the reservoir body and an outlet from the reservoir body for the carrier air flow loaded with powder, wherein the reservoir body is at least in sections divided into a delivery chamber and a storage chamber by means of a separating wall, and the inlet and the outlet communicate with the delivery chamber, and the storage chamber is used for filling the delivery chamber.

13 Claims, 5 Drawing Sheets

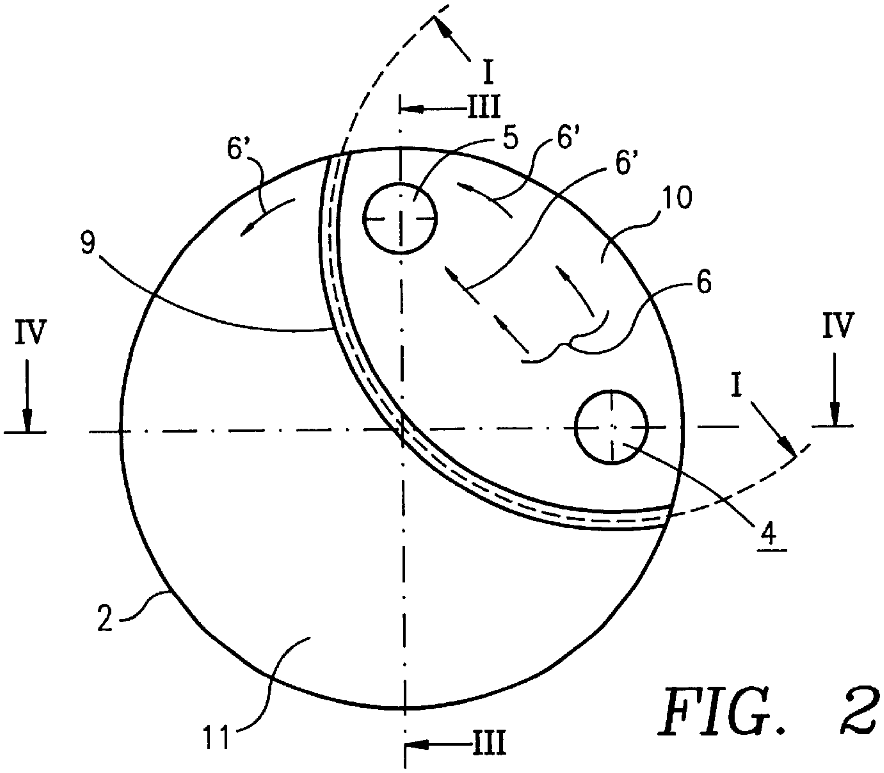
FIG. 2
FIG. 3a
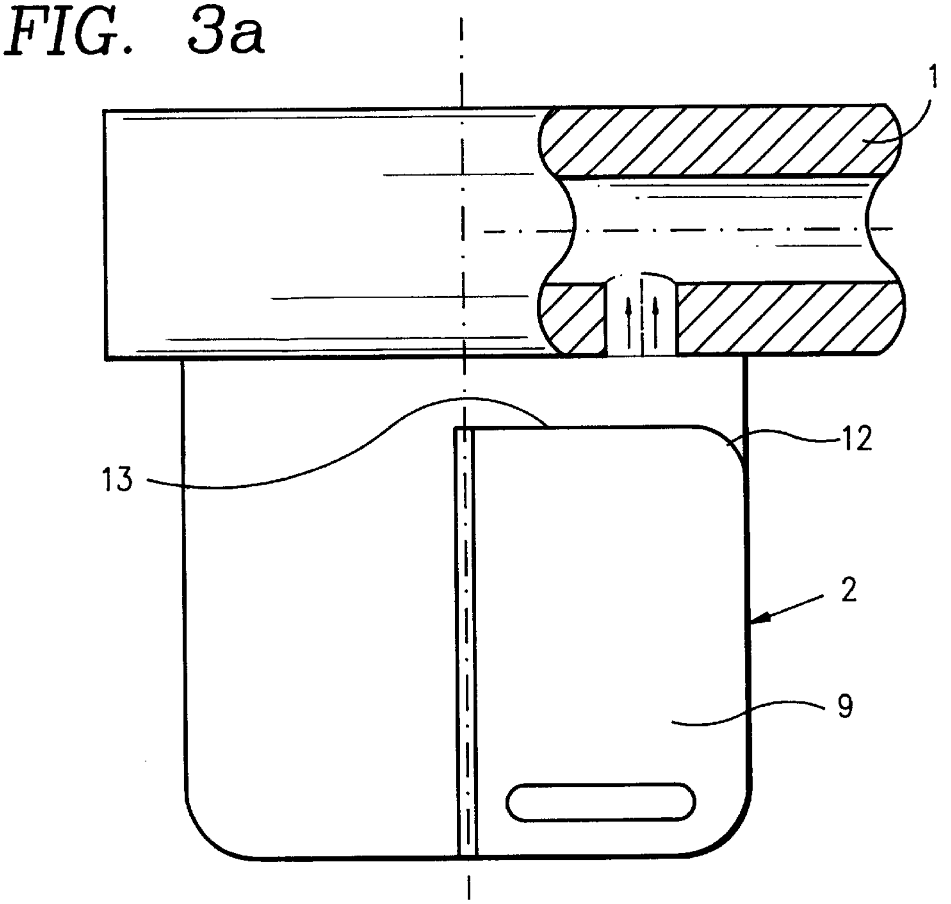

DEVICE FOR DUSTING MOVING PRINTED SHEETS

FIELD OF THE INVENTION

The present invention relates to a device for dusting moving printed sheets, and more particularly to a reservoir for powder used in the device. The reservoir for powder, having an inlet for a carrier air flow terminating in the reservoir and an outlet from the reservoir for the carrier air flow loaded with powder.

BACKGROUND OF THE INVENTION

A device for dusting printed sheets is known, for example from German Published, Examined Patent Application DE-AS 12 52 703, or respectively from German Patent 966 443, wherein a carrier air flow is blown into a container filled with powder so that, although this carrier air flow can be enriched with powder, the proportion of powder in the carrier air flow is greatly dependent on the level of the powder in the reservoir. Considerably more powder is stirred up when the container is full than with an almost empty reservoir, where merely 50% of the initial amount is carried away. Similar devices are known from German Patents 926 910, 913 781 and 969 862.

OBJECT AND SUMMARY OF THE INVENTION

It is an object of the present invention to make available a device of the type mentioned at the outset, wherein the delivery rate of the powder depends less on the level of the powder stored in the reservoir.

In connection with a device mentioned at the outset, this object is attained in accordance with the present invention in that the reservoir is divided into sections including a delivery chamber and a storage chamber by means of a separating wall, and the inlet and the outlet communicate with the delivery chamber, and the storage chamber is used for filling the delivery chamber.

By means of the device in accordance with the present invention, the essential advantage is achieved that the loading of the carrier air is considerably more even and constant and only minimally depends on the level of the powder in the reservoir. This is achieved in that the reservoir is divided into two chambers, and the powder is delivered by means of the carrier air only out of one of these chambers, namely the delivery chamber. This delivery chamber has an almost constant powder level, since powder permanently flows in from the storage chamber into the delivery chamber. When the level of the powder in the storage chamber reaches a lower limit, the storage chamber must be refilled. Since the powder delivery can be maintained essentially constant over a relatively long period of time, the carrier air flow can now be adjusted in such a way that the optimal amount of powder is delivered. A further advantage of the present invention lies in that it is now possible to embody the reservoir considerably larger. With the prior art a very large reservoir was impossible, since in that case the difference between the maximum and minimum delivery rate, which would have increased with the size of the reservoir, would be unacceptably large.

A further development provides that the dividing wall has a control edge, which determines a defined connection cross section between the delivery chamber and the storage chamber. With an initially full reservoir, and therefore also a full delivery chamber, the control edge is used for guiding a portion of the carrier air flow, which is blown on the powder surface and is deflected in a tangential direction, into the storage chamber. If this control edge is formed by at least a section of the upper edge of the dividing wall, the carrier air flow is divided into two partial flows, wherein the one partial flow is guided in the tangential direction via the control edge out of the delivery chamber and steered into the storage chamber. The second partial flow leaves the delivery chamber through the outlet. By means of this division of the carrier air flow into two partial flows the advantage is achieved that the carrier air flow, which initially is loaded with relatively much powder, is not completely taken to the outlet, but only a portion of the carrier air flow. The other portion, which is also laden with powder, reaches the storage chamber, where the powder which is carried along settles. The level of the powder in the delivery chamber is slowly lowered, which leads to the carrier air flow not impacting on the surface of the powder immediately after leaving the inlet, but instead it must travel a certain distance. This leads to the carrier air flow being less strongly deflected in the tangential direction, so that because of this the partial air flow leaving the delivery chamber to pass into the storage chamber is considerably less. Since, along with the lowering level of the powder in the delivery chamber, the loading of the carrier air flow with powder also becomes less, this reduced load is compensated for by a smaller partial air flow being deflected. The amount of powder which is carried along and leaves the delivery chamber together with the other partial air flow through the outlet therefore is essentially as large as it originally was. In this way the reduced loading of the carrier air flow because of the lowering powder level is compensated for by the partial air flow being deflected over the control edge into the storage chamber becoming smaller.

The outlet is advantageously arranged in the area of the control edge, and the inlet and the outlet in the delivery chamber are placed diagonally opposite each other. Because of the relatively large distance between the inlet and the outlet, discrete partial flows can form, wherein the tangential flow moves past the outlet and leaves the delivery chamber and flows into the storage chamber, and the other partial flow, because of its orientation, leaves the delivery chamber through the outlet, carrying along the appropriate amount of powder. Since the inlet is arranged in the immediate vicinity of the separating wall, after impinging on the powder surface the carrier air flow is forced to flow in the tangential direction toward the outlet. The sooner the carrier air flow impinges on the powder surface, the greater the tangential air flow is, which is the case with the delivery chamber being relatively full. If the level in the delivery chamber is lowered, the tangentially flowing partial air flow is also reduced, and the partial air flow in the axial direction is increased.

The inlet and/or the outlet advantageously terminate in the delivery chamber, or respectively leave the delivery chamber, vertically. By means of this the partial air flow is guided directly onto the surface of the powder in a known manner, so that the powder is stirred optimally, or respectively maximally.

It is provided in accordance with one variant of the present invention that the separating wall is connected with the reservoir. With another embodiment the separating wall is arranged on a cover which closes off the storage chamber. This embodiment is preferred, since the inlet and the outlet are also provided on the cover. In this way it is possible to set optimal flow conditions between the inlet, the outlet and the separating wall, which are also retained when removing and then replacing the reservoir again, i.e. they need not be set anew.

Different configurations of the separating wall are conceivable. Thus, the separating wall can be made of one or several pieces and/or curved and/or beveled and/or embodied to extend over the height of the reservoir. It is also conceivable for the separating wall to extend over only a portion of the height of the reservoir, so that the delivery chamber and the storage chamber communicate with each other at the bottom of the reservoir.

It is provided in connection with an exemplary embodiment for the separating wall to have overflow openings for the powder. After reaching a defined powder level, the delivery chamber is charged with powder from the storage chamber through these overflow openings which, for example, are embodied triangularly and taper acutely toward the top. The flow of the powder from the storage chamber into the delivery chamber takes place automatically, since the reservoir performs shaking movements generated by the actuation of air valves. However, the reservoir can also be equipped with a separate shaker, mechanical oscillator, stirrer, or the like, and; FIG. 5 is a perspective view of FIGS. 1*a* and 1*b*, exclusive of the flow channel. Also, an air duct can terminate into the storage chamber, which blows powder from the storage chamber into the delivery chamber at the appropriate time.

Further advantages, characteristics and details of the present invention ensue from the following description, in which exemplary embodiments are represented in detail. In this case the characteristics represented in the drawings and mentioned in the claims as well as in the description can be essential to the present invention either individually or in any arbitrary combination.

BRIEF DESCRIPTION OF THE DRAWINGS

FIG. 2 shows a cross section along line II—II through the reservior of a dusting device in accordance with FIG. 1*a,*

FIG. 3*a* shows a section along line III—III through the dusting device in accordance with FIG. 2.

DETAILED DESCRIPTION OF THE PREFERRED EMBODIMENTS

Figure 1A:
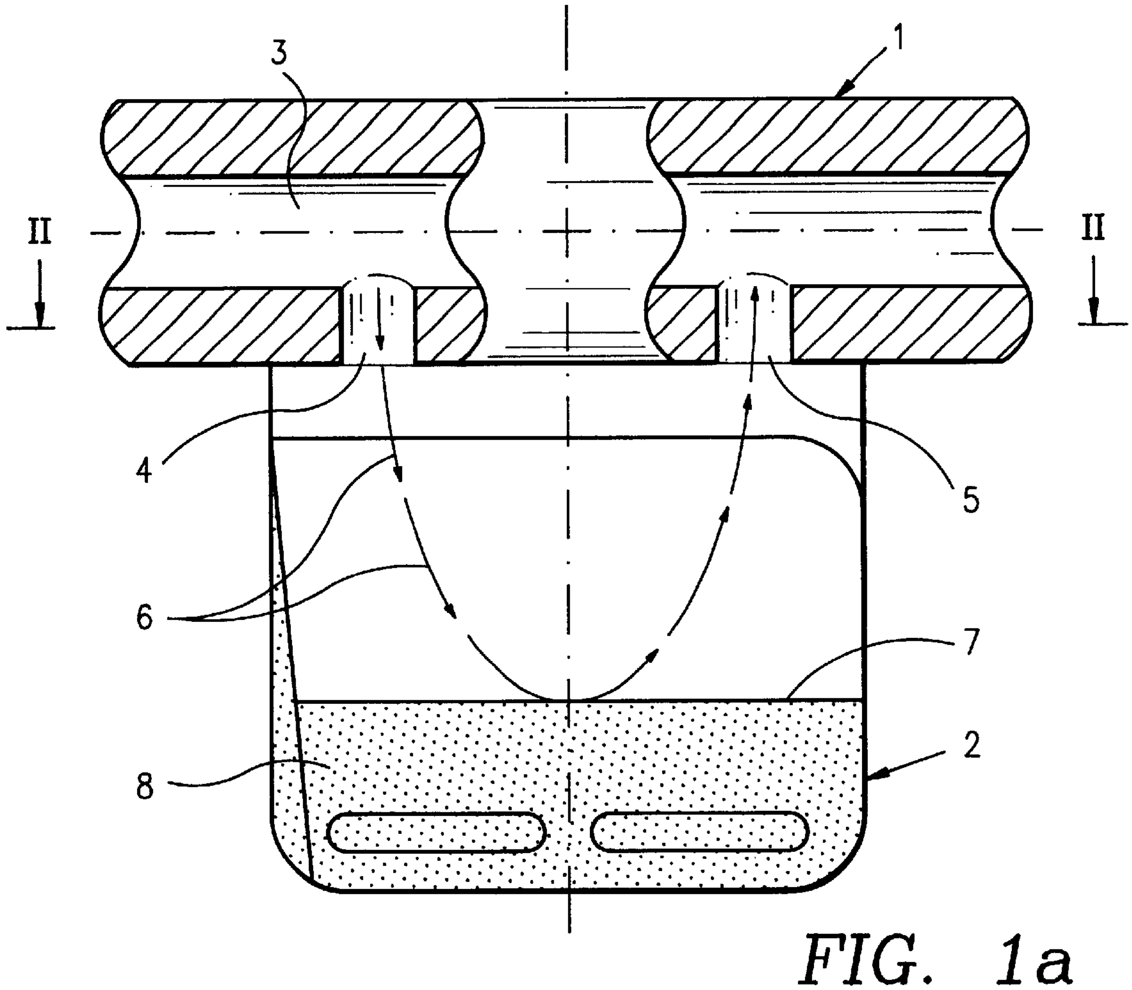
FIGS. 1*a* and 1*b* show longitudinal sections through a reservior of a dusting device with different powder levels.
Figure 1B:
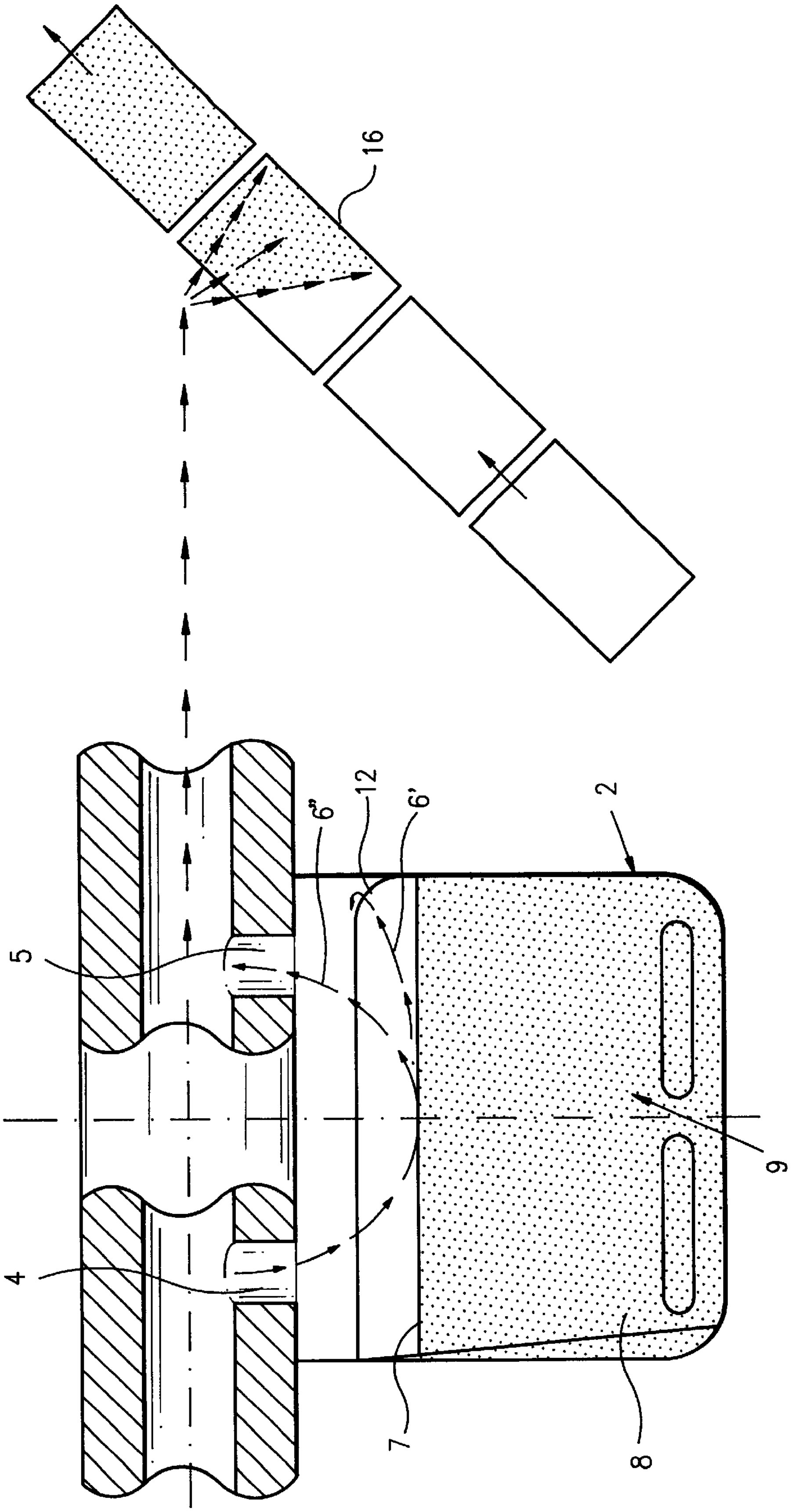

An exemplary embodiment of the reservoir of the dusting device in accordance with the present invention is represented in FIGS. 1*a* and 1*b,* which has a cover 1 and a reservoir body 2. A flow channel 3 for carrier air is provided in the cover 1 and is equipped with an inlet 4 and an outlet 5, wherein the inlet 4 and the outlet 5 terminate in the reservoir body 2, or respectively lead out of it. The path of the carrier air flow is indicated by means of the arrows 6. This carrier air flow leaves the inlet 4 essentially in a vertical downward direction, and is upwardly deflected at the surface 7 of a powder supply 8 in the direction toward the outlet 5. In the process, the carrier air flow stirs up the powder 8 and is loaded with powder particles, which leave the reservoir body 2 by means of the carrier air flow through the outlet 5.

It can be clearly seen in FIG. 2 that the reservoir body 2, which has a cup-shaped form, is divided into a delivery chamber 10 and a storage chamber 11 by curved separating wall 9. The inlet 4 and the outlet 5 terminate in the delivery chamber 10, or respectively lead out of it. Here both the inlet 4 and the outlet 5 are located near the separating wall 9, but essentially lie diagonally opposite each other, i.e. they are at a large distance from each other. The direction of the carrier air flow is essentially represented by means of the arrows 6.

In FIG. 1*b,* which essentially corresponds to FIG. 1*a*, merely a larger amount of powder is in the reservoir body 2, so that the surface 7 is at a lesser distance from the inlet. This causes the carrier air flow leaving the inlet 4 to be deflected relatively rapidly in the tangential direction at the surface 7. In the process, the carrier air flow is divided into a first partial air flow 6' and a second partial air flow 6". Both partial air flows 6' and 6" are loaded with powder, however, the partial air flow 6' flows in the tangential direction and does not leave the reservoir body 2, but passes the separating wall 9 at a control edge 12. The partial air flow 6" leaves the reservoir body 2 through the outlet 5. It can be clearly seen from FIG. 2 how the partial air flow 6' leaves the delivery chamber 10 and enters the storage chamber 11. In the process the powder is carried along and settles in the storage chamber 11. The powder carried along by the partial air flow 6" leaves the delivery chamber 10 through the outlet 5. FIG. 1*b* also shows sheets 16 which receive the powder from inlet 5 and channel 3.

Figure 3B:
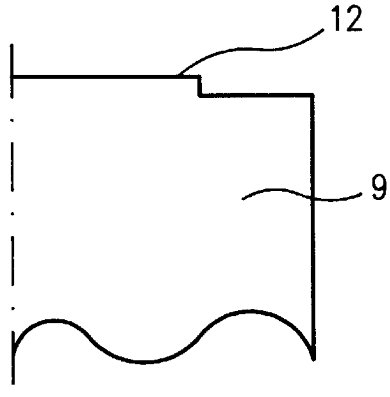
FIG. 3*b* shows an exemplary embodiment of a control edge provided at the separating wall.
Figure 3C:
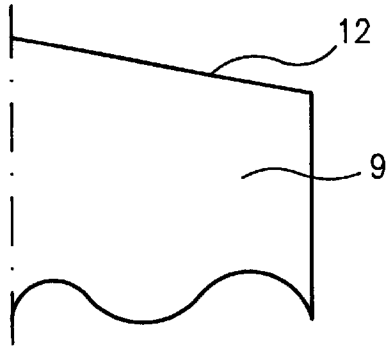
FIG. 3*c* shows a further exemplary embodiment of a control edge provided at the separating wall.
Figure 5:
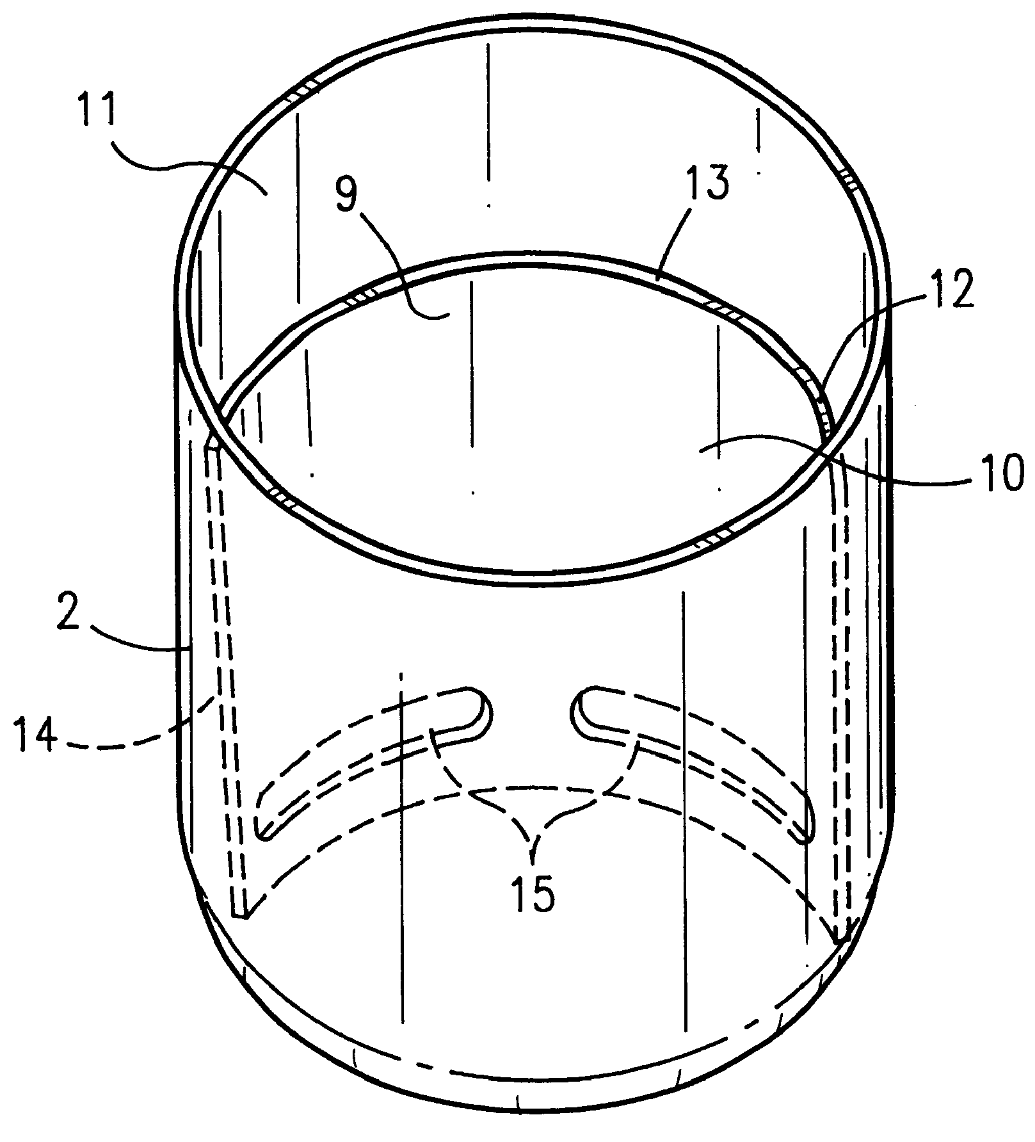

An exemplary embodiment of the control edge 12 is shown in FIG. 3*a,* which represents a section III—III through the reservoir body 2 and the cover 1. It is located at the upper edge 13 of the separating wall 9 and extends downward in the shape of an arc of a circle on its radially outer edge. FIGS. 3*b* and 3*c* show further embodiments, wherein the control edge 12 is formed in a step shape (FIG. 3*b*), or respectively is linearly descending (FIG. 3*c*). It is possible by means of the definite design of this control edge to positively control the ratio of the partial air flow 6' to the partial air flow 6". In this way the delivery rate can be adjusted as desired. FIG. 5 shows the reservoir 2 and the internal component curved separating wall 9 including the openings 14 and 15. The delivery chamber 10 is readily seen in this view.

Figure 4:
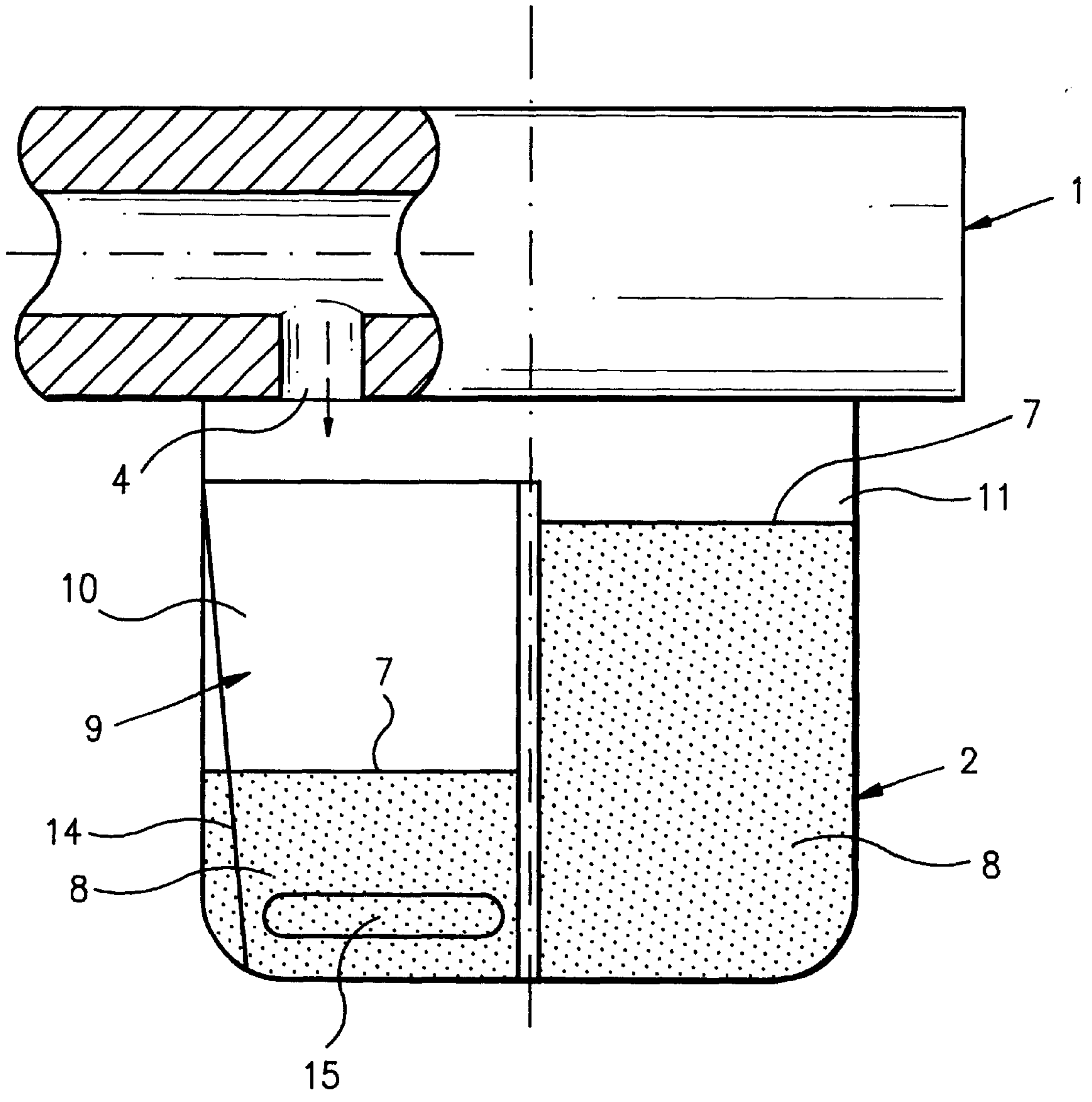
FIG. 4 shows a section along line IV—IV through the arservion of dusting device in accordance with FIG. 2.

If now carrier air is blown through the inlet 4 into the delivery chamber 10, the powder in this delivery chamber 10 is slowly removed by the partial air flow 6", which leaves the delivery chamber 10 through the outlet 5, and by the partial air flow 6', which reaches the storage chamber 11. Because of this the level of the powder supply 8 in the delivery chamber 10 is lowered, while the level of the powder supply 8 in the storage chamber 11 is maintained, or possibly increases because of the deposition of the powder from the partial air flow 6". This can be clearly seen in FIG. 4. There are overflow openings 14 and 15 in the separating wall 9, wherein the overflow opening 14 of the exemplary embodiment represented in FIG. 4 is triangularly designed and tapers acutely toward the top. Powder flows from the storage chamber 11 into the delivery chamber 10 through these overflow openings, in particular through the overflow opening 14, so that the level of the powder supply 8 in the delivery chamber 10 can essentially be maintained at a constant value by the flowing powder. By means of thus keeping the powder level constant, the essential advantage of reducing fluctuations in the delivery rate to a minimum is achieved.

In conclusion it can be stated that by means of the device of the present invention it is possible to essentially maintain the delivery rate constant, although the level of the powder supply 8 in the delivery chamber 10 is initially changed, first by dividing the carrier air flow into a first partial air flow 6' and a second partial air flow 6", wherein the second air flow 6" leaves the reservoir 2, which is divided into a delivery chamber 10 and a storage chamber 11, and the first partial flow 6' moves from the delivery chamber 10 into the storage chamber 11, and that with the level in the delivery chamber decreasing, the ratio between the first partial air flow 6' and the second partial air flow 6" also decreases. In addition, by means of the flow of powder from the storage chamber 11, the level of the powder supply 8 in the delivery chamber 10 is essentially maintained constant starting at a defined height. This also contributes to keeping the delivery rate of the powder constant.

What is claimed is:

1. In a device which dusts moving printed sheets, the improvement comprising:

a reservoir body extending from a carrier air path for providing said powder, said reservoir body being divided into a delivery chamber and a storage chamber by a separating wall said storage chamber containing said powder supply;

an inlet through which carrier air is introduced at a substantially normal angle to said path into said delivery chamber, and an outlet through which carrier air loaded with powder is delivered from said delivery chamber at a substantially normal angle to said path, wherein said storage chamber serves for filing said delivery chamber with powder by the draw of said carrier air, and thereby entraining the powder in the air.

2. In the device as defined in claim 1, wherein said inlet and said outlet are located across from each other in said delivery chamber and define thereby a diagonal direction relative to a center line in said delivery chamber.

3. In the device as defined in claim 1, wherein said inlet is arranged in the immediate vicinity of said separating wall.

4. In the device as defined in claim 1, wherein said separating wall is connected with said reservoir.

5. In the device as defined in claim 1, further comprising:

a cover which closes off said reservoir, wherein said separating wall is arranged on said cover.

6. In the device as defined in claim 1, wherein said separating wall comprises one of a single or multiple pieces, and is one of curved and beveled in its extent.

7. In the device as defined in claim 1, wherein said separating wall extends over the height of said reservoir.

8. In the device as defined in claim 1, wherein said separating wall includes overflow openings for the powder.

9. In the device as defined in claim 8, wherein said separating wall has an upper edge, and wherein said overflow openings have a triangular shape which taper acutely toward said upper edge.

10. In the device as defined in claim 1, wherein said separating wall includes a control edge which defines a connecting cross section between said delivery chamber and said storage chamber.

11. In the device as defined in claim 10, wherein said outlet is arranged in the area of said control edge.

12. In the device as defined in claim 10, wherein said separating wall has an upper edge, and wherein said control edge comprises at least a section of said upper edge.

13. In the device as defined in claim 12, wherein said outlet is arranged in the area of said control edge.

* * * * *